March 1, 1960
C. B. FRANCIS
2,927,016
TREATMENT OF FERROUS SULFATE AND THE
PRODUCTION OF IRON POWDER
Filed May 7, 1957
2 Sheets-Sheet 1
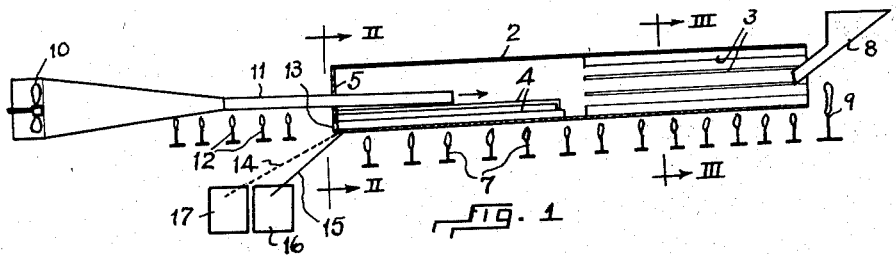
INVENTOR
Charles B. Francis
BY
Christy, Parmelee and Strickland
ATTORNEYS March 1, 1960
C. B. FRANCIS
2,927,016
TREATMENT OF FERROUS SULFATE AND THE
PRODUCTION OF IRON POWDER
Filed May 7, 1957
2 Sheets-Sheet 2
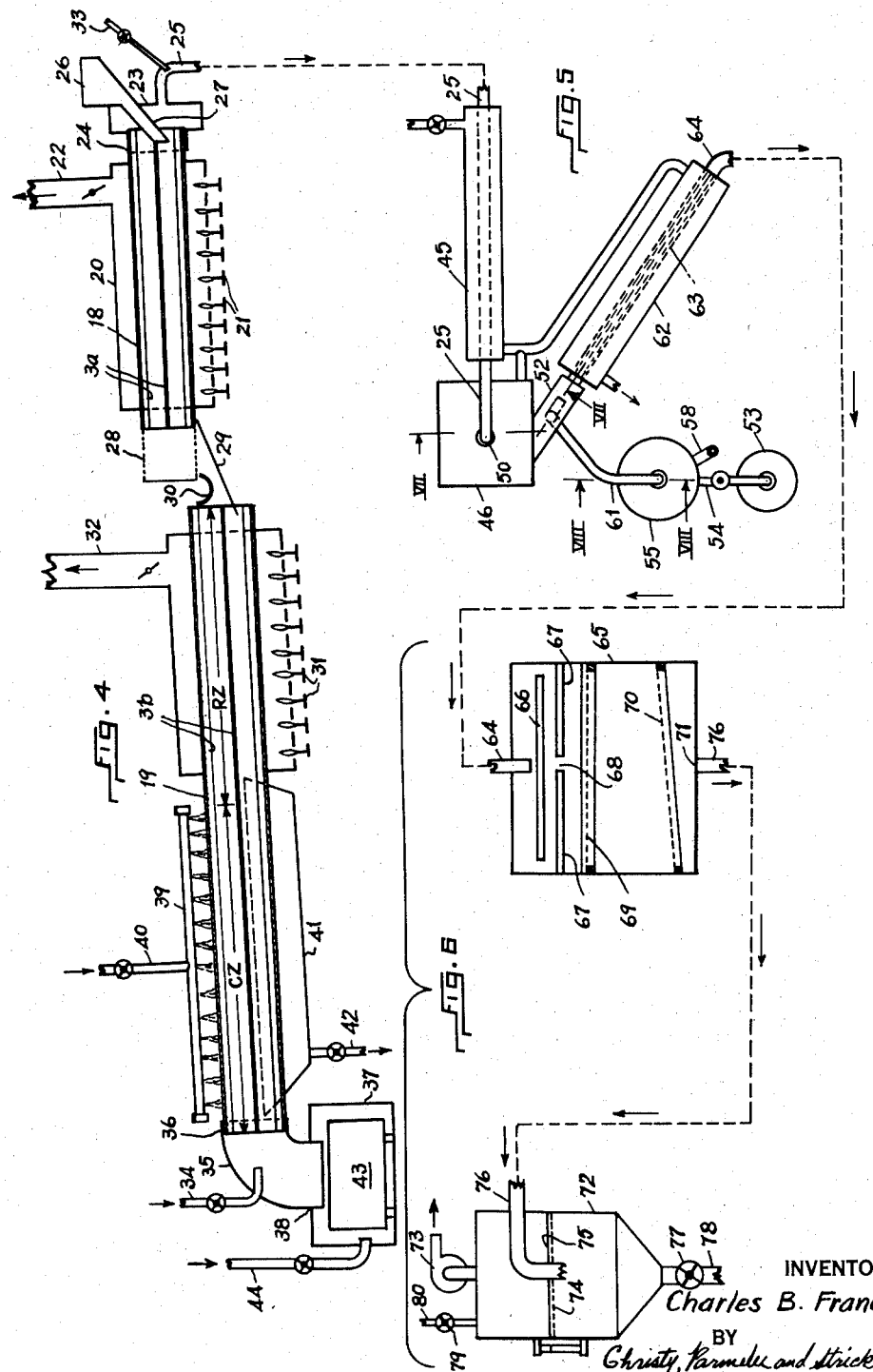
INVENTOR
Charles B. Francis
BY
Christy, Parmelee and Strickland
ATTORNEYS

United States Patent Office 2,927,016
Patented Mar. 1, 1960

2,927,016

TREATMENT OF FERROUS SULFATE AND THE PRODUCTION OF IRON POWDER

Charles B. Francis, Pittsburgh, Pa., assignor to Puriron and Chemicals, Inc., a corporation of Pennsylvania Application May 7, 1957, Serial No. 657,622

13 Claims. (Cl. 75—0.5)

My invention relates in general to the reduction of iron oxide, and to the preparation of iron oxide in such pure form as to permit the production of high purity iron. More particularly, the invention relates to the production of iron powder and certain by-products, especially, if not essentially, from the ferrous sulfate obtained from spent sulfuric acid used in the pickling of iron and steel articles.

The invention consists in certain new and useful improvements in method.

The cardinal object of the invention is to produce metallic iron of high purity.

A further object of the invention is to prepare iron oxide of high purity for reduction to metallic iron, and a still further object is to obtain such iron oxide by the treatment of relatively impure compounds, such as the ferrous sulfate found in spent sulfuric pickling acid.

Still a further object is to produce such products effectively and economically.

Other objects will present themselves in the ensuing specification.

In the description of my invention, I shall first consider pickle liquor as an economic source of ferrous sulfate. The method commonly used in abstracting ferrous sulfate from spent pickling acid or pickle liquor comprises neutralizing with steel scrap the small amount of free acid remaining in the liquor; then evaporating the excess water, and permitting the salt to crystallize under conditions that cause it to form small partly dehydrated crystals, which may be further dried to produce a relatively non-hygroscopic, free flowing salt, called "sugar sulfate," containing approximately 79.5% $FeSO_4$, 20% water and 0.5% impurities. The impurities are principally composed of organic matter derived from the inhibitors used in pickling. If this contaminated salt is reduced with hydrogen the impurities are not eliminated, thus giving an iron powder containing 1.5 to 2.0% total impurities, the present market price of which is less than one-tenth of that of 99.5% of pure iron powder.

Such contaminated sugar sulfate is currently sold by steel plant producers for $1.35 per hundred weight, making the cost of $FeSO_4$ $1.70 per hundred weight, whereas the charge for pure $FeSO_4$ at the present writing is $19.00 per hundred weight. It will be understood, therefore, that the commercial utilization of ferrous sulfate obtained from pickle liquor is of great economic value.

Briefly, my method comprising dehydrating the sugar sulfate and pulverizing or comminuting the $FeSO_4$ at a temperature of substantially 300 to 340° F., decomposing the dry salt at a temperature of substantially from 1100 to 1400° F. in the presence of air to burn-out the contaminating organic matter and to form ferric oxide $Fe_2O_3$ and $SO_2$. The $SO_2$ may be treated to produce sulfuric acid, or it may be combined with a desired base. The $Fe_2O_3$ is reduced with hydrogen at a temperature of substantially from 700 to 900° F., at which FeO is unstable, and the pyrophoric iron powder thus formed is cooled in an atmosphere of hydrogen, or hydrogen and methane, or other inert gases, to a temperature of about 100° F. or well below the temperature at which the powder will ignite spontaneously in air. The cooled powder is delivered to a receptacle or container sealed from the outer atmosphere.

The preferred apparatus for carrying out these various steps in a continuous or semi-continuous sequence is exemplified in the accompanying drawings, in which:

Fig. 1 is a diagrammatic view in longitudinal, vertical section of a dehydrating and pulverizing apparatus;

Fig. 2 is a diagrammatic sectional view of the apparatus, as seen on the plane II—II of Fig. 1;

Fig. 3 is a diagrammatic sectional view of the apparatus, as seen on the plane III—III of Fig. 1;

Fig. 4 is a diagrammatic view in longitudinal section of retort apparatus, in the form of rotating kilns, for treating comminuted and dehydrated ferrous sulfate;

Fig. 5 is a diagrammatic view in plan of apparatus for processing the sulfur dioxide recovered from the sulfate-decomposing apparatus;

Fig. 6 is a diagrammatic view in side elevation of apparatus for processing the product of the apparatus shown in Fig. 5;

Fig. 7 is a diagrammatic sectional view, as seen on the plane VII—VII of Fig. 5; and Fig. 8 is a diagrammatic sectional view, as seen on the plane VIII—VIII of Fig. 5.

Referring to Fig. 1, a retort in the form of cylindrical kiln 2 is mounted to rotate on its longitudinal axis. The bearings for supporting the kiln, inclined at ½ inch per foot, and drive mechanism for slowly rotating the kiln are not illustrated, nor need they be for a full understanding of my invention. This will apply to all retorts or rotating kilns herein described, since such details are within the ken of engineers and mechanics.

The retort 2 is formed steel plate or tubing, and to the interior surface of the retort vanes 3 of steel plate or bars are welded, the vanes 3 extending from the upper end of the retort (the right-hand end in Fig. 1) to about midway of the length of the retort. In the lower half of the length of the retort a cluster of tumbler bars 4 of steel is provided, and these bars are prevented from sliding out of the rotating retort, as by means of a barricade in the form of a steel disk 5 welded at the points 6 to the lower end of the cylindrical retort. The retort is heated to a temperature of from 300 to 340° F., by means of a bank of gas burners 7, while a feeding hopper 8 is similarly heated by a burner 9. A motor-driven fan 10 propells air through a metal tube 11 that extends through the disk 5. Burners 12 serve to heat the air flowing through the tube 11 to at least 212° F., and such heated air streams through the retort and escapes from its open upper end.

In proceeding in accordance with my invention, sugar sulfate is gradually fed from the hopper 8 into the upper end of the rotating retort, wherein it advances right-to-left through the retort, and in the course of its advance the sulfate is heated to 212° F., or more, and is tumbled and tossed by the effect of the vanes 3 in the rotating retort. Under the effect of heat the contained water is driven from the sugar sulfate, while a stream of hot, or rabbled, air moving counter to the advancing sulfate carries the released water vapors out of the retort. As the advancing sulfate passes beyond the inner ends of the vanes 3 it is acted upon by the tumbler rods 4. The tumbler rods grind and pulverize the dehydrated sulfate, and during such action the sulfate continues its right-to-left movement, until at length the comminuted sulfate passes through the arcuate openings 13 (Fig. 2) between the disk 5 and the end of the cylindrical retort, whence the sulfate flows upon a declined screen 14. The smaller particles fall through the screen to a declined chute 15 and slide into a receptacle 16, while the particles moving over the screen drop into a receptacle 17.

The retort 2 will be understood to comprise a retort zone or zones in which sugar sulfate is dehydrated and comminuted, ready for further treatment.

It takes about 230 B.t.u. per pound of sulfate salt to drive off the water from the sugar sulfate. Normally, when a mass of sugar sulfate is heated to drive off its contained water it tends to form a solid cake, and this obstacle is avoided in the practice described, due particularly to the effect of the hot air in removing the water vapor released from the heated sulfate medially of the retort and preventing the water vapor from condensing on the cold sulfate entering the retort, and due also to the comminuting action of the tumbler rods 4. By virtue of the blown stream of hot air, the released water vapor is rapidly carried past the cold sulfate entering the retort, and given no opporunity to condense. The natural tendency of the sulfate to "ball" in the rotating retort is prevented by the tumbler rods. The sulfate is formed into a fine powder.

The fine powder collected in the receptacle 16 is reduced into a fine iron powder, whereas the coarser material collected in the receptacle 17 is reduced to iron particles of correspondingly larger size. The method of producing the iron powder may be advantageously performed in apparatus of the sort illustrated in Fig. 4.

Such apparatus comprises two cylindrical rotating retorts 18 and 19, equipped with internal vanes 3a and 3b, respectively, that extend the length of the retorts. A stationary combustion chamber 20 envelops the retort 18, and a bank of gas burners 21 fire into the chamber below the retort, while the products of combustion escape from above the retort through a dampered stack 22. Both of the rotating retorts 18 and 19 are in inclined in the same manner as the retort 2 already described. A stationary header 23 receives in a snug joint 24 the upper end of the rotating retort 18, and a duct 25 is provided for leading gases from the retort, as will presently appear. A hopper 26 receives the comminuted anhydrous or dehydrated ferrous sulfate prepared in the retort apparatus of Fig. 1, and such sulfate is delivered via a chute 27 that is sealed to and extends through the header 23 into the upper end of the retort 18. In this retort the sulfate advances in right-to-left direction, and in the course of its advance it is heated to a temperature at least equal to the decomposing temperature of the sulfate (a retort temperature of substantially from 1100 to 1400° F. is adequate), whereby oxides of sulfur ($SO_2$ and $SO_3$) are driven from the sulfate and led off through the header 23 and duct 25, under the effect of a slight suction produced by a fan or pump later to be described.

More particularly, the ferrous sulfate, advancing into the hot retort 18, reaches a temperature of about 550° F., it begins to decompose in accordance with the following endothermic reaction:

REACTION 1

$$2FeSO_4 \rightarrow Fe_2O_3 + SO_2 + SO_3$$

$$-83 \text{ kilo cals./g. mol of } FeSO_4$$

While the ferric oxide ($Fe_2O_3$) thus formed continues to move through the retort, and the $SO_2$ and $SO_3$ leave by way of the header 23 and duct 25, about ten (10%) percent of the $SO_3$ is reduced to $SO_2$ by reaction with the organic matter in the sulfate. The remaining $SO_3$ is reduced to $SO_2$ by reaction with hydrogen or natural gas introduced to the duct 25 through a pipe 33. The deaction with hydrogen is indicated by:

REACTION 2

$$SO_3 + H_2 \rightarrow SO_2 + H_2O + 30.6 \text{ kilo cals./g. mol. of } SO_3$$

The reaction with natural gas is:

REACTION 3

$$2SO_3 + CH_4 \rightarrow 2SO_2 + 2H_2O + C$$

$$+52 \text{ kilo cals./g. mol. of } SO_3$$

Nearly all of the carbon released in the latter reaction is deposited on the wall of the duct 25, wherefore the duct 25 is made larger in diameter than is necessary to conduct the gases, and of course any known soot-removal device (not shown) may be provided. Any carbon or organic matter remaining in the material being processed in the retort 18 is burned out by the oxygen in the air that enters through the lower open end of the retort cylinder 18.

The decontaminated and desulfurized material reaches the lower or discharge end of the retort in the form of $Fe_2O_3$. The material ($Fe_2O_3$) flows into a cylindrical screen 28 that forms an open-ended continuation of the rotating retort. The finer particles are sifted through the screen to a chute 29, on which chute the material descends into the upper end of the retort 19, while the oversized particles are discharged from the open end of the rotating screen 28 to a chute 30 leading to a suitable receptacle (not shown).

The retort 18 forms a retort zone in which ferrous sulfate is desulfurized and/or decontaminated of organic material.

The retort 19 forms a reducing zone RZ and a cooling zone CZ. The reducing zone comprises the upper section of the rotating retort that is housed within a stationary combustion chamber fired by means of a bank of gas burners 31, as shown, and the products of combustion are drawn off the top of the chamber, by means of a dampered stack 32. The desulfurized and decontaminated material ($Fe_2O_3$) enters the reduction zone of retort 19 at a preheat temperature of substantially 1100° F., and in such zone the temperature of the material is maintained between 700 and 900° F. in the presence of a reducing gas, such as hydrogen, delivered into the retort from a feed pipe 34 directed through the wall of a stationary elbow 35, that engages the lower end of the rotating retort cylinder 19 in a snug rotary joint 36, and the top wall of a receiving chamber 37 in a hermetic welded joint 38. In the reduction zone of the rotating retort 19, the continuously advancing $Fe_2O_3$, under the effect of heat (700 to 900° F.) in the presence of hydrogen, is reduced to iron powder in accordance with:

REACTION 4

$$Fe_2O_3 + 3H_2 \rightarrow 2Fe + 3H_2O$$

$$-17.3 \text{ kilo cals./g. mol of } Fe_2O_3$$

Six (6) lbs. (1140 cu. ft.) of hydrogen are required to reduce 160 lbs. of $Fe_2O_3$ derived from 304 lbs. of $FeSO_4$, or 3.85 cu. ft. of hydrogen are required per minute for each lb. of $FeSO_4$ fed per minute.

The finely divided (say, from 100 to 325 mesh) iron powder thus provided continues its advance from the reducing zone to and through the rotating retort into and through a zone which is cooled by sprays of cool water issuing from a manifold 39 fed by a supply line 40. The sprays provide an enveloping film of water upon the steel wall of the retort, and the water flows downwardly from surface of the retort into a collector pan 41, from which a drain pipe 42 leads to a sewer.

The iron powder advances through the cooling zone CZ in counter direction to the hydrogen which flows from the pipe 34, through the said cooling zone and into the reduction zone RZ, and during such advance the iron powder is progressively cooled to a temperature of 100° F., or less, a temperature below that at which the iron powder is pyrophoric. The cooled iron powder is discharged from the lower end of the retort 19 into the elbow 35, whence it falls into a receptacle 43 enclosed in receiving chamber 37, from which all air is excluded and an atmosphere of reducing gas maintained. When the receptacle 43 is filled, the chamber 37 is opened and receptacle 43 removed with its burden of iron powder. The cooled iron powder is packed for storage or shipment in vacuum containers.

When starting up the operation of the apparatus, methane or natural gas, or such an inert gas as nitrogen, is used to purge the air from the retort 19. A pipe 44 is provided for delivering purging gas into the chamber 37, the connecting elbow 35 and the retort 19. After these portions of the apparatus are purged, the desired reducing atmosphere is established therein by delivering the selected reducing gas from supply pipe 34, whereupon the apparatus is ready to receive iron oxide from the retort 18 for processing in the manner described. As already indicated, I presently prefer to use hydrogen as the reducing gas.

It is to be noted that my method is particularly effective for the reduction of iron oxide to iron, since the process may be conducted without the use of a fluxing agent or of a solid reducing agent, and without the materials in the reduction zone becoming tacky. The iron oxide ($Fe_2O_3$ in this case) is raised by the blades $3b$ in the rotating tube and dropped through the reducing atmosphere of hydrogen with each rotation of the tube, the tube being rotated at eighteen r.p.m., whereby the iron oxide and the reduced iron powder are dropped and caused freely to fall through the reducing atmosphere in the tube once every three and one-half seconds. The heat absorbed in the endothermic reduction of the iron oxide is quickly restored by the repeated contact of the oxide with the heated wall of the tube every three and one-half seconds.

The flow of the hydrogen through the tube is slow, approximately 22.2 feet per minute, and, since the volume of the water vapor produced in the reducing reaction equals the volume of the hydrogen flowing into the tube, the usual tendency for the iron oxide and iron dust to be swept or buoyed from the open tube is overcome. The water vapor, as soon as it is formed, escapes from the open upper end of the tube, this being due to the mild stack effect prevailing in the inclined hot tube. The reduction of the iron oxide proceeds to completion, and the existence of a condition, wherein the hydrogen and water vapor in contact with the iron oxide or reduced iron reach equilibrium, is prevented. This will be understood from the following context:

It has been discovered that FeO is unstable at temperatures below 1000° F., wherefore in the practice of my method the reduced iron is not reoxidized under the effect of the water vapor. Neither the reaction $Fe+H_2O \rightarrow FeO+H_2$, nor the reaction

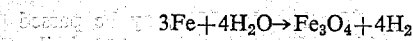
$$3Fe+4H_2O \rightarrow Fe_3O_4+4H_2$$

occurs, because hydrogen is one of the products and because the temperature is held below the temperature (1000° F.) at which reoxidation may progress. By virtue of my process the reduction of the iron oxide proceeds to completion in accordance with Reaction 4. The $Fe_2O_3$ produced in retort 18 enters the reduction zone RZ at about 1100° F. and soon falls to and is maintained substantially at a temperature between 700° F. and 900° F., as described in the following context. The $Fe_2O_3$ is kept in continuous motion by the rotating retort tube 19 and its vanes $3b$. The atmosphere in the upper end of the retort 19 comprises superheated steam produced by the reaction of hydrogen with the $Fe_2O_3$ at points further along in the retort, but this superheated steam neither reacts with nor wets the entering $Fe_2O_3$.

The hydrogen entering the lower end of the retort 19 has a cooling effect on the iron powder moving from zone RZ through zone CZ, and in flowing counter-current in zone CZ the hydrogen is heated by the iron powder being cooled.

When the hydrogen contacts the $Fe_2O_3$ in the zone RZ at a temperature of 700° F., Reaction 4 takes place. The heat absorbed in the latter reaction is slightly more than three times that yielded by the oxide as the temperature of the oxide falls from 1100° F. to 700° F., and this thermal deficiency is made up by the heat supplied by the burners 31. One volume of hydrogen entering Reaction 4 forms one volume of steam, and, as the hydrogen flows counter-current to the advancing $Fe_2O_3$ at a pressure slightly higher than atmospheric, the steam slowly flows out of the open upper end of the retort. Hence, the method of my invention presents all of the advantages, with none of the disadvantages, of prior processes.

Whereas Reaction 4 indicates that $Fe_2O_3$ is reduced to iron in a single step ($Fe_2O_3+3H_2 \rightarrow 2Fe+3H_2O$), there is a possibility that the reduction may take place in two steps, as represented by:

Step 1

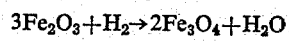
$$3Fe_2O_3+H_2 \rightarrow 2Fe_3O_4+H_2O$$

Step 2

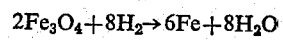
$$2Fe_3O_4+8H_2 \rightarrow 6Fe+8H_2O$$

which added algebraically gives:

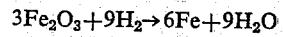
$$3Fe_2O_3+9H_2 \rightarrow 6Fe+9H_2O$$

Dividing this algebraic sum by three gives Reaction 4.

The reaction indicated in "Step 2" is reversible at temperatures above 1025° F., but it will be noted that the reduction temperature specified herein does not substantially exceed 900° F. If "Step 2" does occur in the method hereof, it is effected with dry hydrogen and goes to completion, leaving the one volume of hydrogen required by "Step 1" diluted with eight to nine volumes of water vapor. Since the reaction of "Step 1" is not reversible, and since the hydrogen and water vapor are mixed with the oxide at a temperature which is about 400° F. above that required for hydrogen to react with $Fe_2O_3$, it will be understood that practically all of the hydrogen is consumed. This leads to the conclusion that, if the hydrogen is fed into the retort 19 at a rate to leave no excess hydrogen, and if the time of exposure is sufficient, the oxide is reduced in accordance with Reaction 4, wherefore only superheated steam will escape from the open end of the retort (19). The pilot plant operations I have conducted indicate these assumptions to be factual.

While hydrogen has been specified as the preferred medium for reducing the oxide, it will be understood that a mixture of hydrogen and methane may be used. Alternatively, water gas may be used, or a 500 B.t.u. coke oven gas comprised of hydrogen, methane, carbon monoxide and carbon dioxide. In the event coke oven gas is used the vapor and residual gases leaving the reduction zone RZ may be collected, as by placing a header over the open end of the retort 19, similar to header 23 on retort 18. The residual gas thus collected may be dried, and it will provide a fuel gas having a heat value of about 1000 B.t.u. per cubic foot.

Returning to a consideration of the dehydrating retort 2, it has been stated that a stream of heated air is the medium for conducting the released water vapor away from the heated sulfate, and that such vapor cannot condense and moisten the sulfate. A stream or streams of other gases may be used with drying effect for the purpose. Also it may be noted that the milling or pulverizing of the material may be effected in a zone associated with the decomposing zone (18), in lieu of or in addition to the milling or pulverizing of the material in the dehydrating retort.

Whereas the iron powder produced in the reduction zone RZ (Fig. 4) is cooled in an inert atmosphere formed by the reducing gas flowing from the pipe 34 (and/or the pipe 44) to the reduction zone, it will be understood that the inert atmosphere of the cooling zone CZ may be formed by another gas or gaseous mixture, such as inert nitrogen, or a mixture of nitrogen and hydrogen, or methane. In still further modification, the reduction of the iron oxide, obtained from the pulverized, dehydrated and decomposed iron salt, may be reduced to a finely divided iron powder with a hydrogenous reducing gas under higher than atmospheric pressure in a heated reduction zone, such as that used in the familiar H-iron process.

I now turn to a consideration of the by-products that may be produced in the practice of my invention.

Of course, the $SO_3$ and $SO_2$ released in the desulfurizing retort or zone 18 may be processed for the production of sulfuric acid. I have found, however, that a more valuable by-product may be obtained.

The duct 25 leads the $SO_2$, mixed with a small quantity of other gases, through a water cooler 45 to a scrubber 46 shown in vertical cross-section in Fig. 7. This scrubber contains water up to a constant level 47, as indicated by gauge glass 48. One-half inch below this water level a corrosion-resistant steel sheet 49 is positioned, the sheet having a large number of small perforations ($\frac{1}{12}$ inch in diameter), and a large opening at the center to fit closely about the lower notched end of a down-take pipe 50, to which duct 25 is connected. The gases, cooled by unit 45, flowing through pipe 50 spread out beneath the perforated sheet 49 and bubble through the ½ inch of water above it. This action serves further to cool the $SO_2$ to the temperature of the water in the scrubber, removes dust, mainly $FeSO_4$ which dissolves in this water, and any trace of $SO_3$ which combines with the water to form $H_2SO_4$. Also, the scrubber produces a back pressure of only ½ inch of water, which water soon becomes saturated and permits all of the $SO_2$ to pass through an outlet 51 to an ammonium hydroxide reactor tube 52.

Anhydrous ammonia, which is obtained on the open market as a liquid contained in steel cylinders (see cylinder 53 in Fig. 5), is first passed via a pipe 54 into a water reactor 55 shown in vertical section in Fig. 8. The reactor is a cylindrical vessel about half filled with water 56 and provided with a gauge glass 57, a water inlet 58, and a special inlet device 59 having a float or check valve 60 provided at the bottom, to prevent back flow, because $NH_3$, delivered by pipe 54, is very soluble in water and reacts with it to form ammonium hydroxide, thus:

REACTION 5

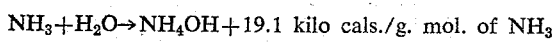
$NH_3+H_2O \rightarrow NH_4OH+19.1$ kilo cals./g. mol. of $NH_3$

Likewise $SO_2$ combines with water to form sulfurous acid, thus:

REACTION 6

$SO_2+H_2O \rightarrow H_2SO_3+18$ kilo cals./g. mol. of $SO_2$

If these two products combine they form ammonium sulfite plus two molecules of water, which is too wet. However, the amount of water vaporized can be restricted to half that of these two reactions by controlling the temperature of the water in scrubber 46 and in reactor 55, which in turn controls the partial vapor pressure of the water therein. For example, by holding the temperature of the water in each at 160° F., or the temperature of the $NH_3$ reactor 55 below 85° F. and the temperature of the scrubber 46 between 185 and 190° F., the reactions of the products delivered by a pipe 61 to the reactor tube 52 are represented by the following:

REACTION 7

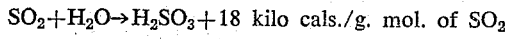
$SO_2+2H_2O+2NH_3 \rightarrow (NH_4)_2SO_3 \cdot H_2O$
$+61.3$ kilo cals./g. mol. of the salt Because of the heat generated in the reaction and due to the fact that the salt sublimes at 320° F. the salt is in a gaseous or vapor state. This vapor is cooled to between 302 and 304° F., by passing it through water cooler 62 (Fig. 5) comprised of four or more thin-walled galvanized iron tubes 63 immersed in (or sprayed with) water in cooler 62. From the tubes 63 in cooler 62 the salt vapors flow through a duct 64 into a large rectangular condensing chamber 65 (Fig. 6) where the vapors first contact a large cooling plate 66, then pass around the sides of this plate into a narrow space bounded by two other cooling plates 67, spaced to have a narrow opening 68 at the center. The first plate 66 cools the vapors to slightly below 302° F. and some of it condenses and is deposited upon the other two plates 67, but 90% or more of the condensate passes through the opening 68 in the form of a very fine powder or fume, suspended in the mixture of air and other gases that fill the chamber 65. To agglomerate the powder a framed screen 69 composed of four layers of 16-mesh galvanized wire screen is placed across the chamber. This screen retains a substantial part of the agglomerated powder, while the rest settles upon a filter cloth 70 attached to a wood frame positioned against the wall of the chamber, and tilted at an angle of about 15°. In lieu of cloth 70 a filter bag may be used, with its opening attached peripherally to the frame holding the screen 69.

To recover the last trace of ammonium sulfite an outlet 71 at the bottom of the condensing chamber 65 is connected to a water separator 72 (Fig. 6) which is similar to the scrubber 46. By applying suction (1 in. of water, or more) to the system by means of a motor-driven fan 73, the air and other gases are drawn from outlet 71 of the chamber 65 and through a discharge pipe 76 to beneath a perforated plate 74 immersed immediately below the surface of a pool of water 75. The water dissolves the sulfite until it become saturated, after which the salt settles to the bottom of separator 72 and is removed by opening a valve 77 in discharge pipe 78. The pool of water is replenished in separator 72 by opening valve 79 in a water supply line 80.

In lieu of the apparatus illustrated in Fig. 6, the ammonium sulfite formed may be cooled to a suitable temperature below its sublimation point in cooler 62 and passed into a bag house, such as that used in the manufacture of "zinc white." The collection of a fine powder or fume in a bag house follows a proceduce so well known in the art as to require no illustration herein.

In modification of the procedure described, the $SO_2$ from the scrubber 46 may be dried, by passing it through a similar scrubber containing a concentrated solution of sulfuric acid, or through a tower packed with barium oxide, or anhydrous calcium sulfate. Then the $SO_2$ may be compressed to a liquid (14° F.) in commercial steel cylinders for distribution and use as a refrigerant, or a bleaching agent (for straw, paper pulp, wood, wool), or as a disinfectant, preservative, or an exterminator of rats, mice, spiders, etc.

In still further modification the $SO_2$ may be passed directly from the scrubber 46 into a rotating retort similar to the retort 2 used for dehydrating the sugar sulfate, and in such retort sodium sulfite may be produced by feeding sodium carbonate into the higher end of the tube, and feeding the $SO_2$ into the lower end of the tube, to flow counter-current to the solids. The reaction is:

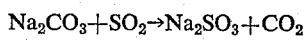
$Na_2CO_3+SO_2 \rightarrow Na_2SO_3+CO_2$

The application for these Letters Patent comprises a continuation-in-part of my application Serial No. 446,278, filed July 28, 1954, now Patent No. 2,818,328.

Having disclosed the presently preferred practice of my invention, it will be understood that many modifications and variations may be applied within the spirit of the invention defined in the appended claims.

I claim:

1. The method of treating ferrous sulfate for chemical treatment which comprises repeatedly raising, dropping and advancing such sulfate through a zone heated to a temperature above 212° F. and below that at which ferrous sulfate is thermally decomposed and thereby driving off the contained water from such sulfate, and comminuting the so-treated sulfate in the heated zone to provide a finely divided anhydrous ferrous sulfate.

2. The method of treating ferrous sulfate including contaminating organic material obtained from the sludge of pickle liquor which comprises repeatedly raising, dropping and advancing such sulfate through a zone heated to a temperature above 212° F. and below that at which ferrous sulfate is thermally decomposed and thereby driving off the contained water from such sulfate, comminuting the so-treated sulfate in the heated zone for the formation of a finely divided anhydrous sulfate, and heating the comminuted sulfate to above the decomposing temperature thereof in the presence of oxygen and thereby burning out the said organic material preparatory to further treatment of the sulfate.

3. The method of treating ferrous sulfate including organic material obtained from the sludge of pickle liquor which comprises repeatedly raising, dropping and advancing such sulfate through a zone heated to a temperature above 212° F. and below that at which ferrous sulfate is thermally decomposed and thereby driving off the contained water from the sulfate, comminuting the so-treated sulfate in the heated zone for the formation of a finely divided anhydrous sulfate, and heating the comminuted sulfate to above the decomposing temperature thereof in the presence of oxygen and thereby burning out the said organic material and converting the sulfate to ferric oxide, with the release of oxides of sulfur.

4. The method herein described which comprises repeatedly raising, dropping and advancing sugar ferrous sulfate through a zone heated to a temperature above 212° F. and below that at which ferrous sulfate is thermally decomposed and thereby driving off the contained water from such sulfate, comminuting the so-treated sulfate while heated to above atmospheric temperature to provide a finely divided anhydrous ferrous sulfate, advancing the latter sulfate through successive zones in retort apparatus, effecting under heat in one of said zones the release of oxides of sulfur from the sulfate, and in a succeeding one of said zones heating the advancing desulfurized finely divided anhydrous material in the presence of a reducing gas to produce iron powder.

5. The method of treating ferrous sulfate including contaminating organic material which comprises repeatedly raising, dropping and advancing such sulfate through a zone heated to a temperature above 212° F. and below that at which ferrous sulfate is thermally decomposed and thereby driving off the contained water from such sulfate, comminuting the so-treated sulfate while heated to above atmospheric temperature for the formation of a finely divided anhydrous sulfate, advancing the latter sulfate through successive zones in retort apparatus, in one zone heating the comminuted sulfate to above the decomposition temperature thereof in the presence of oxygen and thereby burning out said contaminating organic material and effecting the release of sulfur oxides from the sulfate, and in a succeeding zone heating the advancing decontaminated and desulfurized finely divided anhydrous material in the presence of a reucing gas to produce iron powder.

6. The method of treating ferrous sulfate that contains contaminating organic material obtained from the sludge of pickle liquor which comprises continuously advancing such sulfate through a zone heated to a temperature above 212° F. and below that at which ferrous sulfate is thermally decomposed while passing preheated air counter current to the sulfate moving through the zone and thereby driving off the contained water from such sulfate, comminuting the so-treated sulfate for the formation of a finely divided anhydrous sulfate, advancing the latter sulfate through successive zones in retort apparatus, in one zone heating the comminuted sulfate to above the decomposition temperature thereof and thereby oxidizing said contaminating organic material and effecting the removal of the sulfur oxides from the sulfate for the production of sulfuric acid, and in two succeeding zones, heated and cooled, respectively, repeatedly raising, dropping and advancing the decontaminated and desulfurized finely divided anhydrous material, while it retains substantial quantities of heat applied to it for decomposition, in the presence of a reducing gas mixture containing hydrogen to produce iron powder and then cooling the iron powder and introducing it in the presence of a non-oxidizing gas to a receptacle.

7. The method herein described which comprises repeatedly raising, dropping and advancing sugar ferrous sulfate through a zone heated to a temperature above 212° F. and below that at which ferrous sulfate is thermally decomposed while passing preheated air counter current to the sulfate through said zone and thereby driving off the contained water from such sulfate, comminuting the so-treated sulfate to provide a finely divided anhydrous ferrous sulfate, repeatedly raising, dropping and advancing the latter sulfate through successive zones in retort apparatus having heated walls, in one of said zones effecting under applied heat the removal of the sulfur oxides from the sulfate for the production of sulfuric acid, and in a succeeding zone holding the advancing desulfurized finely divided anhydrous material, while it retains substantial quantities of heat applied to it for decomposition, at a temperature of substantially from 700 to 900° F. in the presence of a reducing gas to produce iron powder.

8. The method herein described which comprises repeatedly raising, dropping and advancing sugar ferrous sulfate through a zone heated to a temperature above 212° F. and below that at which ferrous sulfate is thermally decomposed while passing counter current to the sulfate a stream of preheated air and thereby driving off the contained water from such sulfate, comminuting the so-treated sulfate to provide a finely divided anhydrous ferrous sulfate, repeatedly raising, dropping and advancing the latter sulfate through successive zones in retort apparatus, in one of said zones effecting under applied heat the removal of the sulfur oxides from the sulfate, and in a succeeding zone in the presence of a reducing gas and at a temperature of substantially from 700 to 900° F. reducing desulfurized finely divided anhydrous material, while it retains substantial quantities of heat applied to it for decomposition, to iron powder, and in a succeeding zone cooling the iron powder as it moves through the reducing gas to a receptacle.

9. The method of treating ferrous sulfate that contains contaminating organic material obtained from the sludge of pickle liquor which comprises continuously advancing such sulfate through a zone heated to a temperature above 212° F. with preheated air flowing therethrough and below that at which ferrous sulfate is thermally decomposed and thereby driving off the contained water from such sulfate, comminuting the so-treated sulfate for the formation of a finely divided anhydrous sulfate, repeatedly raising, dropping and advancing the latter sulfate through successive zones in retort apparatus, in one of said zones heating the comminuted sulfate to a temperature of substantially from 1100 to 1400° F. and thereby oxidizing said contaminating organic material and effecting the removal of the sulfur oxides from the sulfate, and in the presence of a reducing gas heating the decontaminated and desulfurized material in another of said zones, while such material retains substantial quantities of the heat applied to it for the removal of the sulfur oxides, to a temperature substantially within the range of from 700 to 900° F. and thereby producing iron powder, and thereafter in a succeeding zone cooling the iron powder in a non-oxidizing atmosphere.

10. The method of producing iron powder which comprises dehydrating iron sulfate by advancing it through a zone heated to a temperature below that at which such sulfate decomposes and in the presence of a preheated air stream for conducting released water vapor away from the sulfate, milling the dehydrated sulfate into finely divided form, decomposing the sulfate under the effect of heat for the production of finely divided heated iron oxide and the recovery of oxides of sulfur, repeatedly raising, dropping and advancing the heated iron oxide through a heated atmosphere comprised of hydrogen and thereby reducing such iron oxide into finely divided iron powder, and cooling such iron powder in an inert atmosphere below the temperature at which the iron powder is pyrophoric.

11. The method herein described which includes advancing ferrous sulfate containing water through a zone having a temperature above 212° F. and below that at which the ferrous sulfate thermally decomposes, and in the course of such advance repeatedly raising the sulfate while it is in contact with a heated surface and repeatedly dropping the sulfate from its contact with such surface through an atmosphere comprised of a stream of preheated air flowing in a direction counter to the advance of the sulfate, with the effect that the preheated air stream cooperates with the heated surface first in driving the water in vapor form from the advancing material to provide dry ferrous sulfate and then in carrying the vapor from the zone under conditions inhibitive of its condensation.

12. The method herein described which includes advancing a mixture of organic substance and ferrous sulfate containing water through a zone having a temperature above 212° F. and below that at which the ferrous sulfate thermally decomposes, and in the course of such advance repeatedly raising the mixture while it is in contact with a heated surface and repeatedly dropping the mixture from contact with such surface through an atmosphere comprised of a stream of preheated air flowing in a direction counter to the advance of the mixture, with the effect that the preheated air stream cooperates with the heated surface first in driving the water in vapor form from the advancing mixture, and then carrying the vapor from the zone under conditions inhibitive of its condensation; in combination with the steps of comminuting the dry mixture of sulfate and organic substance while it is at a temperature above atmospheric, and heating the mixture to above the decomposing temperature of the sulfate in the presence of oxygen and thereby burning out the said organic substance and converting the sulfate to ferric oxide, with the release of oxides of sulfur.

13. The method herein described which includes advancing ferrous sulfate containing water through a zone having a temperature above 212° F. and below that at which the ferrous sulfate thermally decomposes, and in the course of such advance repeatedly raising the sulfate while it is in contact with a heated surface and repeatedly dropping the sulfate from its contact with such surface through an atmosphere comprised of a stream of preheated air flowing in a direction counter to the advance of the sulfate, with the effect that the preheated air stream cooperates with the heated surface first in driving the water in vapor form from the advancing material to provide dry ferrous sulfate and then in carrying the vapor from the zone under conditions inhibitive of its condensation; in combination with the steps of comminuting the sulfate while it is at a temperature above atmospheric to provide a finely divided anhydrous ferrous sulfate, advancing the latter sulfate through successive zones in retort apparatus, in one zone effecting under heat the release of sulfur oxides from the sulfate, and in succeeding zones in the presence of a reducing gas heating the advancing desulfurized finely divided anhydrous material to produce iron powder, and then cooling the iron powder as it moves through the reducing gas to a receptacle.

References Cited in the file of this patent

UNITED STATES PATENTS

| | | |
|---|---|---|
| 22,614 | Andres et al. | Jan. 18, 1859 |
| 1,275,232 | Edison | Aug. 13, 1918 |
| 1,453,057 | Williams | Apr. 24, 1923 |
| 1,864,593 | Gustafsson | June 28, 1932 |
| 2,004,799 | Richardson | June 11, 1935 |
| 2,065,618 | Sherwood | Dec. 29, 1936 |
| 2,296,522 | Hartley | Sept. 22, 1942 |
| 2,413,492 | Firth | Dec. 31, 1946 |
| 2,438,584 | Stewart | Mar. 30, 1948 |
| 2,581,752 | Collier | Jan. 8, 1952 |
| 2,792,298 | Freeman | May 14, 1957 |
| 2,805,144 | Stotler | Sept. 3, 1957 |

FOREIGN PATENTS

| | | |
|---|---|---|
| 643,862 | Great Britain | Sept. 27, 1950 |